United States Patent [19]

Feinland et al.

[11] Patent Number: 5,226,496
[45] Date of Patent: Jul. 13, 1993

[54] METHOD AND APPARATUS FOR FAST DETERMINATION OF WEIGHTS

[75] Inventors: Seymour Feinland, Stamford; Gerald C. Freeman, Norwalk, both of Conn.

[73] Assignee: Pitney Bowes Inc., Stamford, Conn.

[21] Appl. No.: 768,793

[22] Filed: Sep. 27, 1991

[51] Int. Cl.⁵ .............. G01G 19/40; G01G 23/10; G06F 15/20
[52] U.S. Cl. .................. 177/25.15; 177/185; 364/464.02
[58] Field of Search .............. 177/25.15, 185; 364/464.02, 567

[56] References Cited

U.S. PATENT DOCUMENTS

| | | | |
|---|---|---|---|
| 4,091,449 | 5/1978 | Meckstroth et al. | 177/25.15 |
| 4,817,026 | 3/1989 | Inoue et al. | 177/185 X |
| 4,849,918 | 7/1989 | Feinland | 177/25.15 X |
| 4,864,521 | 9/1989 | Feinland | 177/25.15 X |
| 4,956,782 | 9/1990 | Freeman et al. | 364/464.02 |

Primary Examiner—George H. Miller, Jr.
Attorney, Agent, or Firm—Robert H. Whisker; Melvin J. Scolnick

[57] ABSTRACT

A scale for fast determination of weights including a platform and load cell transducer. Output of the transducer is converted to a digital signal, processed by a low pass digital filter, and weights computed as a function of the sequence of digital signals by means of an algorithm which compares a first estimate of the weight to the break points of a postal rate chart and user the first estimate if it is not within a predetermined distance of a break point, and otherwise determines a second, more accurate estimate. The platform and transducers are combined to form a structure which does not have any significant resonance below the cut off frequency of the filter.

17 Claims, 4 Drawing Sheets

1

METHOD AND APPARATUS FOR FAST DETERMINATION OF WEIGHTS

BACKGROUND OF THE INVENTION

The present application and co-pending, commonly assigned U.S. application Ser. No. 07/767,301 (C-815), and 07/768,143 (C-821), filed on even date herewith, and U.S. application Ser. No. 575,021; filed Aug. 30, 1990, now U.S. Pat. No. 5,082,072 relate to a project of the assignee of the subject invention, and share common elements of disclosure.

The subject invention relates to scales and a method of operating such scales to rapidly determine weights. More particularly, the subject invention relates to postal scales and the like.

Postal scales are well known. Such scales weigh a mail piece, and determine the appropriate postage for that mail piece as a function of the weight.

Mailing systems where a mail piece is transported onto a postal scale, the appropriate postage is determined and used to set a postage meter, and the mail piece is then transported to the postage meter for imprinting with a postal indicia representative of the postage amount are also known. One such system is described in U.S. Pat. No. 4,742,878; issued: May 10, 1988; to the inventors of the subject invention. In such systems there is a constant need to increase the rate at which the scale can determine the weight of a mail piece in order that the throughput of the system can be increased.

U.S. Pat. No. 4,787,048; issued: Nov. 22, 1988; to the inventors of the subject invention, discloses one approach to decreasing the time required for a postal scale to determine the weight of a mail piece. The system disclosed in this patent takes advantage of the structure of postal rate charts, i.e., the function which relates the weight of a mail piece to the appropriate postage amount. As can be seen in FIG. 1, such rate charts provide a constant postage value for all weights between pairs of predetermined breakpoints. The system of the '048 patent takes advantage of this by use of an algorithm where a first estimate of the weight is made and used to determine the postage amount, unless the first estimate is within a predetermined distance of a breakpoint, in which case a second more accurate estimate is made.

Another approach to providing high throughput mailing systems has been the use of vibrating tray scales to determine the weight of a mail piece where the weight is estimated as a function of the frequency at which a scale tray vibrates after a mail piece is placed upon it and the system is excited. Such a system is described in the above mentioned, commonly assigned U.S. Pat. No. 5,082,072. While such prior art systems have proven generally satisfactory there is still a need for a scale system and method of operation which are suitable for use with load cell technology while still providing desired high throughout rates for mailing systems and the like.

A BRIEF SUMMARY OF THE INVENTION

The above objects are achieved and the disadvantages of the prior art are overcome in accordance with the subject invention by means of an apparatus and method wherein a mail piece is supported on a pan, which is in turn supported by a transducer for generating a series of signals representative of the instantaneous response of the pan when the mail piece is received. Typically, the transducer will include a load cell. A processor receives the output signals from the transducer and detects the presence of a mail piece on the pan.

Once a mail piece has been detected the processor examines all sequences of the transducer signals which are of a first length to determine the difference between the maximum and minimum values for each of these first length sequences. When the first of such first length sequences for which the difference is less than a first threshold is found, the processor determines a first estimate of the weight of the mail piece as a function of the first first length sequence. If the first estimate is not within a predetermined distance of a break point the system determines the postage amount using the first estimate for the weight. If the first estimate is within the predetermined distance the processor averages adjacent, non-intersecting sequences of a second length; and then examines all sequences of the averages having a third length to determine the difference between the maximum and minimum averages for each of the sequences. When the first of the sequences of averages for which the difference is less than a second threshold, the processor determines a second estimate as a function of the transducer output signals used to determine the averages, and using the second estimate to determine the postage amount.

In accordance with another aspect of the subject invention the system computes estimates for the weight of the mail piece as functions of the transducer output signals which make up the sequences tested in the manner described above. In further accordance with this aspect of the subject invention the first of the signals is not evaluated in these functions, as the first of the signals may fall on the rapidly rising leading edge of the transient response, and be anomalous.

In accordance with another aspect of the subject invention, the processor operates to determine weights for a representative series of mail pieces and the average time for determining such weights is approximately equal to a predetermined time. In this embodiment the pan and transducer are connected to form a structure, the stiffness of this structure being great enough with respect to the mass of the structure that the structure has no resonances below a predetermined frequency, where the period of the predetermined frequency is substantially less than the predetermined time.

In accordance with another aspect of the subject invention output signals from the transducer are processed by a low pass filter to filter frequencies above the above mentioned predetermined frequency. In accordance with this aspect of the subject invention when a mail piece is detected on the scale pan, the filter may be operated at a higher sampling rate for a temporary period to increase its cut-off frequency and allow the filtered output of the transducer to reach its stable state more quickly. Alternatively, when a mail piece is detected on the scale pan the filter may be by-passed temporarily. Preferably this filter will be a digital filter.

In accordance with one embodiment of the subject invention the system includes a transport for transporting the mail piece onto the scale pan in a controlled and repeatable manner.

Those skilled in the art will recognize from the above description that the subject invention advantageously achieves the above described objects in decreasing the time in which a postal scale can determine a postage amount for a mail piece. Other objects and advantages of the subject invention will be apparent to those skilled in the art from consideration of the attached drawings and the detailed descriptions set forth below.

DETAILED DESCRIPTION OF PREFERRED EMBODIMENTS OF THE SUBJECT INVENTION

Figure 2:
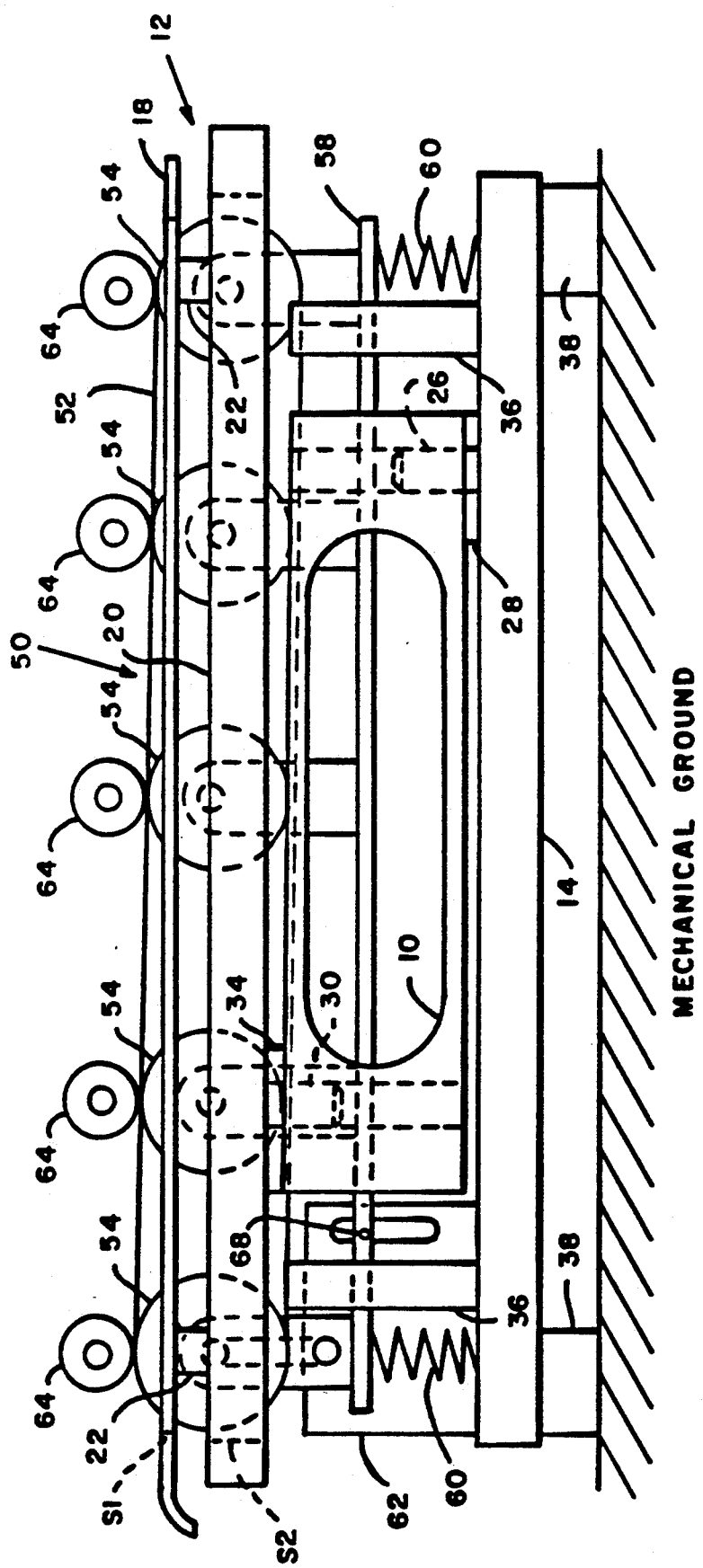
FIG. 2 shows a schematic side view of a scale pan and load cell transducer structure in accordance with the subject invention.

Referring to FIG. 2 a schematic diagram shows a side view of a weighing module in accordance with one embodiment of the subject invention. Such a module can be used, for example, in a high speed mailing system, such as that described in commonly assigned, U.S. Pat. No. 5,082,072 as a replacement for the vibrating tray scale system described in that patent.

In FIG. 2 a commercially available load cell supports a pan assembly 12 on scale base 14. Assembly 12 includes a pan 18 which is mounted on a stiffening structure 20, commonly referred to as a "spider", by mounts 22.

Load cell 10 is connected to base 14 in a cantilevered manner by bolt 26 and spacer 28. Assembly 12 is fastened in a similar manner to load cell 10 by bolt 30 and spacer 34. This manner of mounting a scale pan is conventional and results in load cell 10 acting as a four bar linkage which deflects vertically in response to loads on pan 18.

The weighing module of FIG. 2 also includes stops 36, which protect load cell 10 against excessive deflections. Base 14 is supported on mechanical ground by resilient supports 38. Preferably supports 38 are formed of a vibration damping material, as is taught in U.S. Pat. No. 4,479,561; to Feinland et al.

Scales and weighing modules comprising a pan supported on a base by a load cell mounted as a four bar linkage are well known in the art and, in general, a more detailed description of their construction is not believed necessary for an understanding of the subject invention.

The weighing module also includes a transport mechanism 50 for transporting mail pieces onto pan 18 in a controlled and repeatable manner. Transport 50 includes belt 52 which is supported on and driven by rollers 54. Rollers 54 are in turn supported by structure 58, which is supported on base 14 by springs 60. Thus, as mail pieces are transported and stopped the necessary forces are not felt by load cell 10 but are transferred through support 58 and springs 60 to base 14 and then to mechanical ground.

Transport 50 projects above the surface of pan 18 through slots S1 and S2 provided in pan 18 and structure 20 respectively, so that a mail piece which is fed from a feed mechanism (not shown) is transported to a position above but not on pan 18 by transport 50.

Transport 50 is driven by a conventional drive 62 and mail pieces are guided on belt 52 by rollers 64 in a conventional manner.

Drive 62 also includes activator 68 for lowering support 58 and transport 50 against the resistance of springs 60, so that after a mail piece is stopped above pan 18 it is lowered onto pan 18 in a controlled and repeatable manner.

A transport similar to that described above is included in the mailing system of the above mentioned U.S. Pat. No. 5,082,072, and is described in that patent. which is hereby incorporated by reference. In another embodiment of the subject invention a transport system may be mounted on the pan assembly of a weighing module so that the entire weight of the transport system forms part of the tare of the weighing module. Such a system is described, for example, in the above mentioned U.S. Pat. No. 4,742,878; which is also hereby incorporated by reference.

In general details of the construction of transport systems for transferring mail onto weighing modules are not considered as part of the subject invention nor as necessary for an understanding of the subject invention. However, it should be recognized that transfer of the mail piece onto the weighing module in a controlled and repeatable manner is advantageous in making a rapid determination of the weight of the mail piece.

Figure 3:
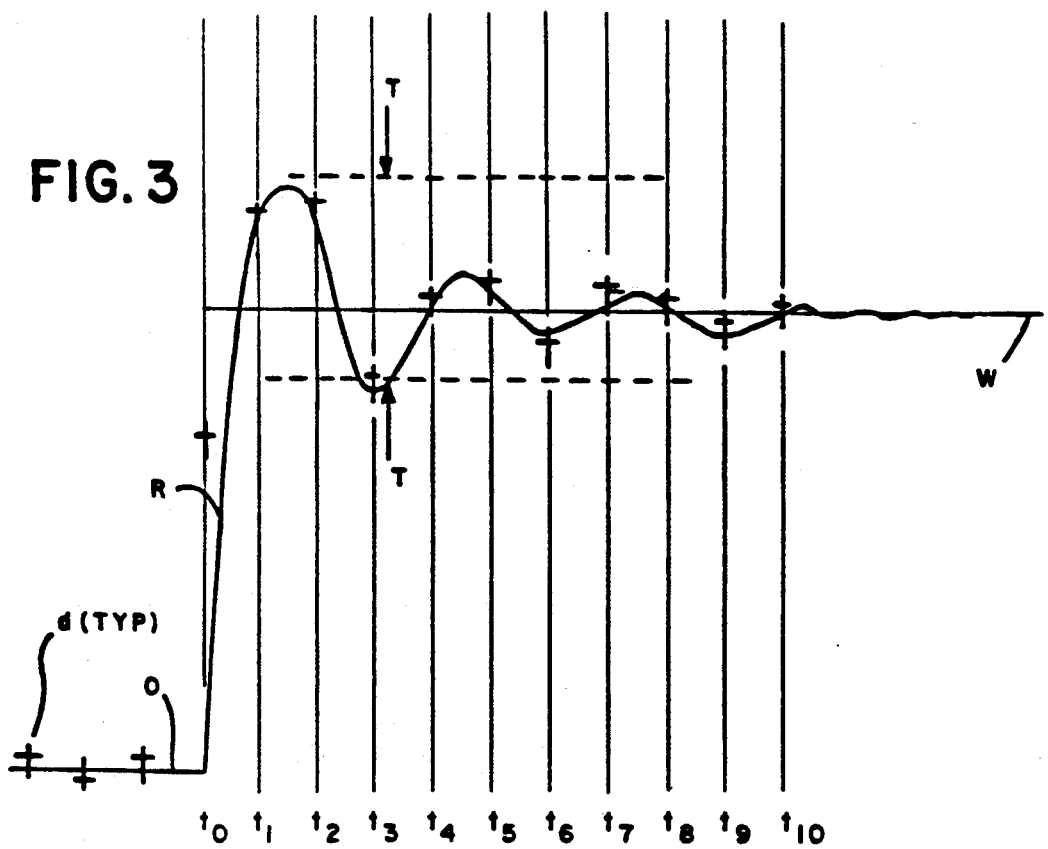
FIG. 3 shows a graphic representation of the instantaneous response of the scale pan to application of a mail piece and the corresponding transducer output.

FIG. 3 shows a graphic representation of the response of pan assembly 12 when a mail piece is applied. At a time prior to $t_0$ a signal is received indicating that a mail piece has been applied. Preferably this signal will be generated by the system when transport 50 is stopped and lowered to apply the mail piece. As can be seen in FIG. 3, the response R rapidly raises from the zero value and then shows a damped oscillation which converges to a value W representative of the weight of the applied mail piece. Beginning at time $t_0$ digital signals d representative of response R are produced, as will be described further below.

Figure 4:
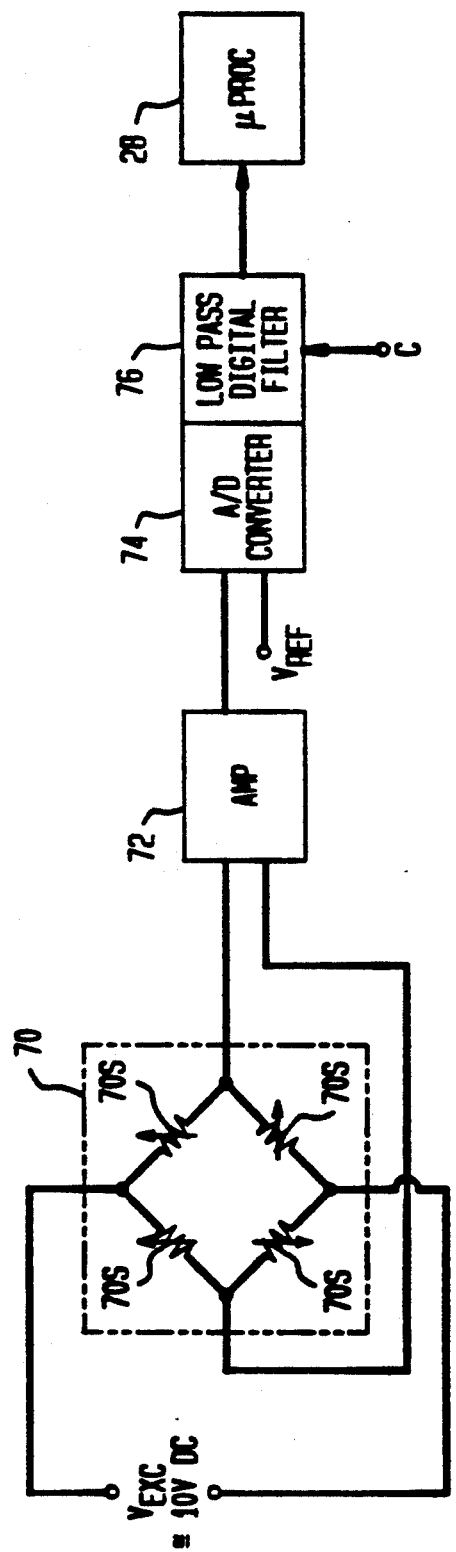
FIG. 4 shows the electronic circuitry of the load cell transducer of FIG. 2.

FIG. 4 shows circuitry which converts the mechanical displacement of load cell 10 into digital signals d for further processing. Strain gauge 70 comprises four strain sensors 70s which are physically fixed to load cell 10 in a conventional manner, and which are resisted elements whose resistance changes in response to strain in load cell 10. Sensors 70s are connected to form a bridge circuit which is excited with a dc voltage. The output of strain gage 70 is an analog electrical signal representative of the mechanical displacement of load cell 10 and, correspondingly, pan 18 in response to the application of a mail piece. This signal is amplified by amplifier 72, which is preferably an instrumentation amplifier, such as the Model AD624, available from Analog Devices Inc. This amplified signal is then input to a commercially available analog-to digital converter (A/D) 74 where it is converted into a series of digital signals representative of samples of the analog signal, as shown in FIG. 3.

The digital signals are then processed by a low pass digital filter 76. Preferably such filter would be a six pole Bessel filter which may be implemented in a either a) known manner in any of a number of commercially available microprocessors especially adapted for digital signal processing; or b) within an A/D of the sigma-delta type, which contains an integral six-pole Bessel filter, and whose digital output is already filtered. Preferred A/D's which include such filters based on digital signal processing techniques, and which have a conversion rate sufficiently high for fast weighing are Models 5501 and 5503 available from Crystal Semiconductor Corp. Filter 76 is helpful to minimize the affects of vibrations felt by load cell 10 which are above the cut-off frequency of filter 76. In a preferred embodiment of the subject invention which is intended to determine the weights of a representative series of mail pieces within an average time of approximately 250 milliseconds this cut off frequency is approximately five Hz. Because digital filtering is substantially an averaging process over at least one cycle of a frequency of interest it is not possible to filter lower frequencies within the desired time constraints of this embodiment of the subject invention.

Accordingly, in accordance with a preferred embodiment of the subject invention, pan assembly 12 and load cell 10 should be constructed and connected to form a structure which is sufficiently stiff in relation to its mass that it will have no substantial resonances (i.e., frequencies at which the structure naturally tends to vibrate) below a selected frequency, where the period of this selected frequency is substantially less than the predetermined average time for determining the weight of a mail piece (and the periods of the cut-off frequency of the filter). Pan assembly 12 may be stiffened in various conventional manners know to those skilled in the art, such as addition of supporting ribs, or its mass may be reduced by selectively drilling holes, etc. Load cell 10 may be stiffened by providing a load cell whose capacity is substantially greater than that required for the application. For example, where load cell 10 is to be used in a mailing machine such as that described in the above mentioned U.S. Pat. No. 5,082,072, where the maximum weight for a mail piece is expected to be on the order of a pound, a load cell capable of handling up to about 15 lbs. may be used to provide the necessary stiffness.

Signals d which are output by low pass filter 76 are received by microprocessor 78 and processed to determine the weight of the applied mail piece as will be described further below.

Figure 5:
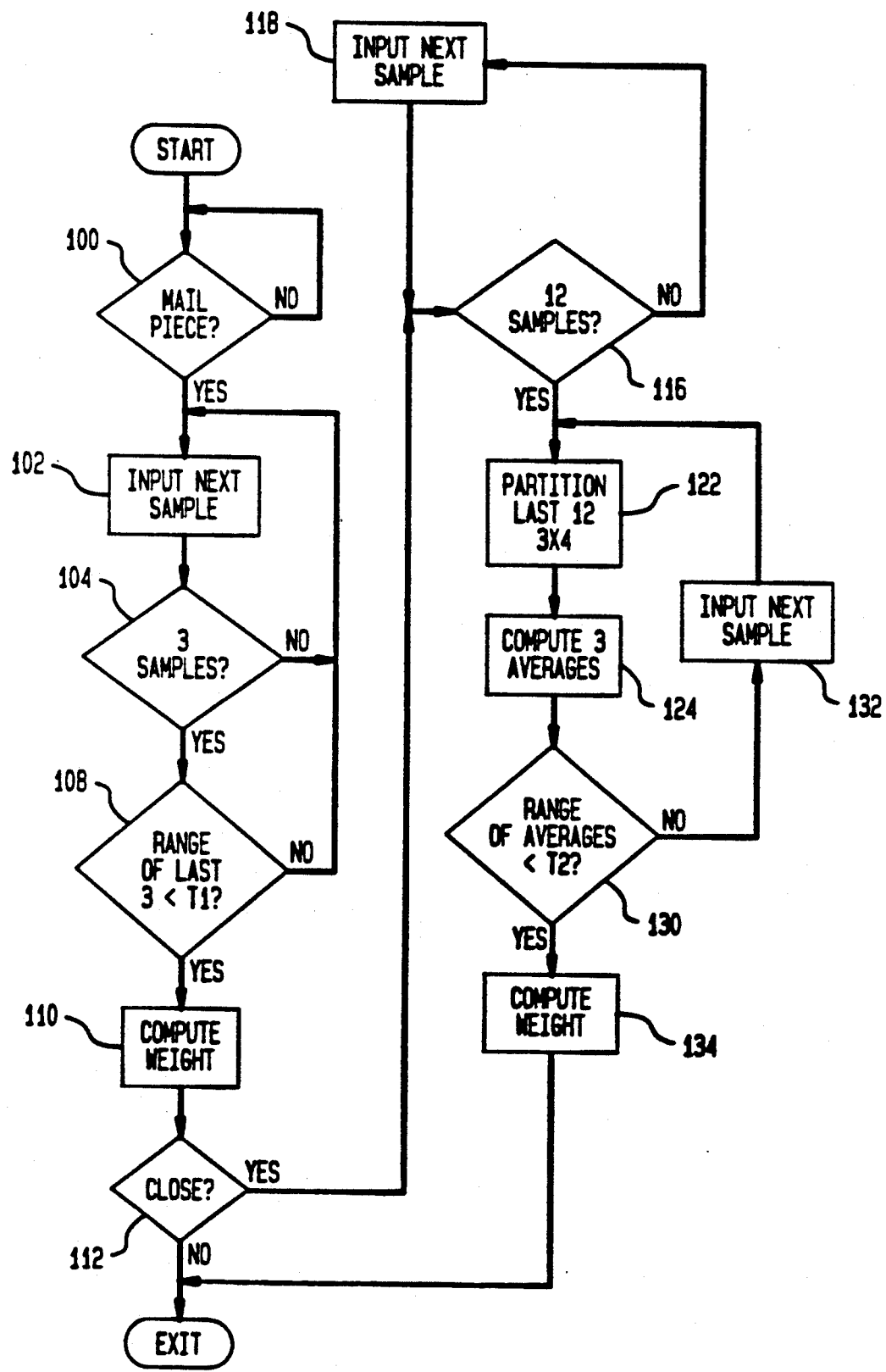
FIG. 5 shows a flow chart representation of the operation of the scale system of the subject invention in determining a weight for a mail piece.

FIG. 5 shows a flow chart of the operation of micro processor 78 in determining the weight of the applied mail piece in response to the series of signals d received from low pass filter 76.

At 100 microprocessor 78 waits for a signal from the system that a mail piece has been placed upon pan 18. Alternatively, as is known in the art microprocessor 78 may detect the rising edge of the transient response when a mail piece is applied. When a mail piece is applied, at 102 microprocessor 78 inputs the next sample (i.e., signal d), and at 104 tests to determine if it has accumulated three samples. If not it returns to 102 until three samples are accumulated.

When a sequence of three samples is accumulated microprocessor 78 determines the range (i.e., the difference between the maximum and minimum sample of the sequence) and tests if that range is less than a predetermined threshold T1. In a preferred embodiment threshold T1 is approximately 3/32 ounces. If the range of the samples is not within threshold T1 microprocessor 78 loops back through 102 to input the next sample and continues to loop through 108 until the last three samples tested do have a range less than threshold T1. Thus, all sequence of length three are tested until a first whose range is less than threshold T1 is found.

Figure 1:
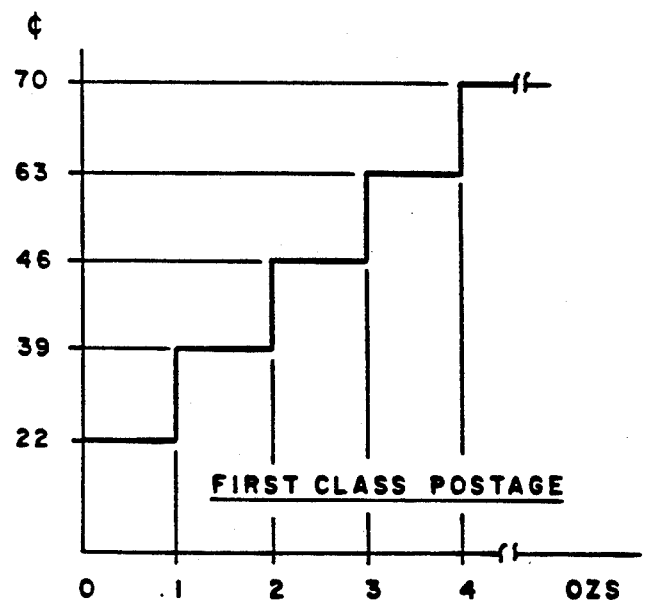
FIG. 1 shows a typical postal rate chart.

Then at 110 microprocessor 78 computes an estimate for the weight of the mail piece, as will be described further below. At 112 microprocessor 78 tests to determine if the first estimate computed at 110 is within a predetermined distance of a breakpoint in a postal rate chart such as that shown in FIG. 1. If the first estimate is not within the predetermined distance then the first estimate is used to compute the postage value in a conventional manner well known to those skilled in the art.

Assuming that the first estimate is within the predetermined distance of a breakpoint, then at 116 microprocessor 78 tests to determine if 12 samples are available. If not, it loops through 118 until four samples are available, and then at 122 partitions the 12 most recent samples into 3 consecutive groups of 4 consecutive samples, and at 124 computes an average for each of the 3 groups. Then, at 130 microprocessor 78 tests to determine if the range of the averages is less then a second threshold T2. If not, at 132 the next sample is input and microprocessor 78 loops through 122.

Once a sequence of three averages having a range less then threshold T2 are found then at 130 microprocessor 78 computes the second estimate for the weight and uses the second estimate to determine the postage amount for the mail piece.

Applicants note that methods similar to that used to determine the second estimate are known for use to estimate weights in scale products marketed by the assignee of the subject invention, but are used to provide a sole weight estimate.

In the above mentioned U.S. Pat. No. 4,787,048 a postal scale where first and second estimates are computed for the weight of a mail piece and the second estimate is used when the first estimate is sufficiently close to a break point is disclosed. In the preferred embodiment disclosed in this patent the first estimate was based on two consecutive samples having a range less then a first threshold, and the second estimate was based on three consecutive samples having a range less than a second, smaller threshold. Since the development of the postal scale of the '048 application, Applicants have realized that a substantial improvement in the average time to determine the weight of a mail piece can be achieved by an improved method of calculating the first estimate. In accordance with applicants invention the first estimate is determined as a function of three or more, and preferable three, samples whose range is less than threshold T1. The first estimate is then computed as the average of all samples, except for the earliest sample. This computation allows use of a relatively wide threshold T1 so that the first estimate is determined quickly yet provides sufficient accuracy so that the first estimate may be used near to a breakpoint, so that a larger portion of weights can be determined using the first estimate.

Examination of FIG. 3 will show that frequently the first sample taken after a mail piece is applied will fall on the raising edge of the transient response. With, in the preferred embodiment described above, threshold T1 equal to 3/32 ounces the first sequence which has a range less than threshold T1 frequently will include this first sample. Accordingly, Applicants have learned that a more accurate estimate is achieved by discarding the possibly anomalous first sample. Using this method of computing the first estimate Applicants have determined that the first estimate may be accepted if it is no close than approximately 1/16 ounces to a breakpoint.

In one embodiment of the subject invention, the sampling rate is temporarily increased so that the cut-off frequency of filter 76 is approximately doubled when a mail piece is detected, allowing signals to respond more quickly to the rapidly rising edge shown in FIG. 3. In another embodiment, filter 76 may simply be by-passed when a mail piece is detected.

Applicants have also determined that an average time of approximately 250 milliseconds for determining the weight of a mail piece can be achieved with a second threshold T2 of approximately 1/32 ounces. The second estimate is then computed as the average of all samples comprised in the sequence of three averages, again excepting the earliest sample, for the reasons described above. This second estimate is found to satisfy suitable for postal scales (i.e. ±1/32 of an ounce).

In a preferred embodiment of the subject invention, wherein: the first estimate is computed as the average of the first and second samples of a sequence of three samples whose range is less than approximately 3/32 ounces, the second estimate is computed as the average of all samples except for the earliest, of a sequence of three groups of four samples whose averages have a range less than approximately 1/32 ounces the samples are taken at approximately 20 millisecond intervals, and are processed by a digital filter having a cut off frequency of 5 Hz. the pan assembly and load cell structure has no resonances below approximately 5 Hz. and the mail piece is applied to the scale pan in a controlled and repeatable manner; an average time to determine the weight of representative series of mail pieces has been observed to be approximately 260 milliseconds. (Note that in this observation, data samples were recorded and processed off-line to facilitate evaluation of the results.)

What is claimed is:

1. A postal scale for determining the postage amount for a mail piece as a function of the weight of said mail piece, said function having a constant value over at least one weight range between predetermined breakpoints, comprising:
   a) means for supporting said mail piece;
   b) transducer means for generating a series of signals representative of the instantaneous response of said supporting means;
   c) processing means responsive to said transducer signals for:
      c1) detecting the presence of said mail piece on said support means;
      c2) examining all subsequent sequences of said transducer signals having a first length to determine the difference between the maximum and minimum values for each of said first length sequences; and
      c3) for the first of said first length sequences for which said difference is less than a predetermined threshold determining first estimate for said weight as the average of said values, except for the first value, comprising said first length sequence; then,
      c4) if said first estimate is not within a predetermined distance of one of said breakpoints using said first estimate to determine said postage amount; and
      c5) if said first estimate is within said predetermined distance, examining additional sequences of said transducer signals to make a second, more accurate estimate, and using said second estimate to determine said postage amount.

2. A postal scale as described in claim 1 wherein said processing means is further for determining weights of a representative sequence of mail pieces, the average time for said determining of weights of said representative sequence being approximately equal to a predetermined time; and wherein said supporting means and said transducer means are connected to form a structure having a stiffness sufficiently great in relation to its mass that said structure has non resonances below a predetermined frequence, the period of said predetermined frequency being substantially less than said predetermined time.

3. A postal scale or described in claim 2 wherein said transducer means further comprises a low pass digital filter for processing said transducer signals prior to output, said filter having a cut-off frequence approximately equal to said predetermined frequency.

4. A postal scale or described in claim 3 wherein the rate of said series of transducer signals is temporarily increased during a period approximately coincident with the initial response of said support means when said mail piece is applied by a factor such that said cut-off frequency is approximately doubled.

5. A postal scale or described in claim 3 wherein said digital filter is by-passed during a period approximately coincident with the initial response of said support means when said mail piece is applied.

6. A postal scale or described in claims 1 or 2 wherein said weight range is 1 ounce, said predetermined distance to said break points of 1/16th of an ounce, and said first threshold is 3/32's of an ounce.

7. A postal scale or described in claims 1 or 2 further comprising means for applying said mail piece to said to said supporting means in a controlled and repeatable manner.

8. A postal scale or described in claims 1 or 2 wherein said determination of said second estimate further comprises:
   a) averaging a series of adjacent, non-intersecting sequences of said transducer signals, said adjacent signals having a second length;
   b) examining all sequences of said averages having a third length to determine the difference between the maximum and minimum averages for each of said sequences;
   c) for the first of said sequences of averages for which said difference is less than a second threshold determining a second estimate of said weight as a function of the values of all of said transducer signals comprised in said first sequence of averages; and,
   c) using said second estimate to determine said postage amount.

9. A postal scale or described in claim 8 wherein said second length is 4 of said transducer signals, said third length is 3 of said averages and said second threshold is 1/32 of an ounce.

10. A postal scale or described in claim 8 wherein said values comprised in said first sequence of average include values comprised in said first length sequence.

11. A postal scale or described in claim 10 wherein said second estimate is determined as the average of all of said values comprised in said first sequence of averages, except for the first value.

12. A method for determining the postage amount for a mail piece as a function of the weight of said mail piece, said function having a constant value over at least one weight range between predetermined breakpoints, comprising:
   a) placing said mail piece on a support;
   b) generating signals representative of the instantaneous response of said support;

c) detecting the presence of said mail piece on said support;

d) examining all subsequent sequences of said signals having a first length to determine the difference between the maximum and minimum values for each of said first length sequences; and e) for the first of said first length sequence for which said difference is less than a predetermined threshold is found determining a first estimate for said weight as the average of said values, except for the first value, comprising said first length sequence; then, f) if said first estimate or not within a predetermined distance of one of said breakpoints using said first estimate to determine said postage amount; and, g) if said first estimate is within said predetermined distance examining additional sequences of said signals to make a second more accurate estimate and using said second estimate to determine said postage amount.

13. A method as described in claim 12 wherein said method is further for determining weights of a representative sequence of mail pieces within a predetermined average time, and wherein support is connected to a transducer for producing said signals, said support and said transducer forming a structure having a stiffness great enough in relation to its mass that said structure has no resonances below a predetermined frequency, the period of said frequency being substantially less than said predetermined average time.

14. A method as described in claims 12 or 13 wherein said mail piece is applied to said support on a controlled and repeatable manner.

15. A method as described in claims 12 or 13 wherein said signal are processed by a digital low pass filter having a cut-off frequence approximately equal to said predetermined frequency.

16. A method as described in claim 15 wherein the rate of said series of signals is temporarily increased during a period approximately coincident with the initial response of said support when said mail piece is applied by a factor such that said cut-off frequency is approximately doubled.

17. A method as described in claim 15 wherein said digital filter is by-passed during a period approximately coincident with the initial response of said support when said mail piece is applied.

* * * * *